Figure 1:
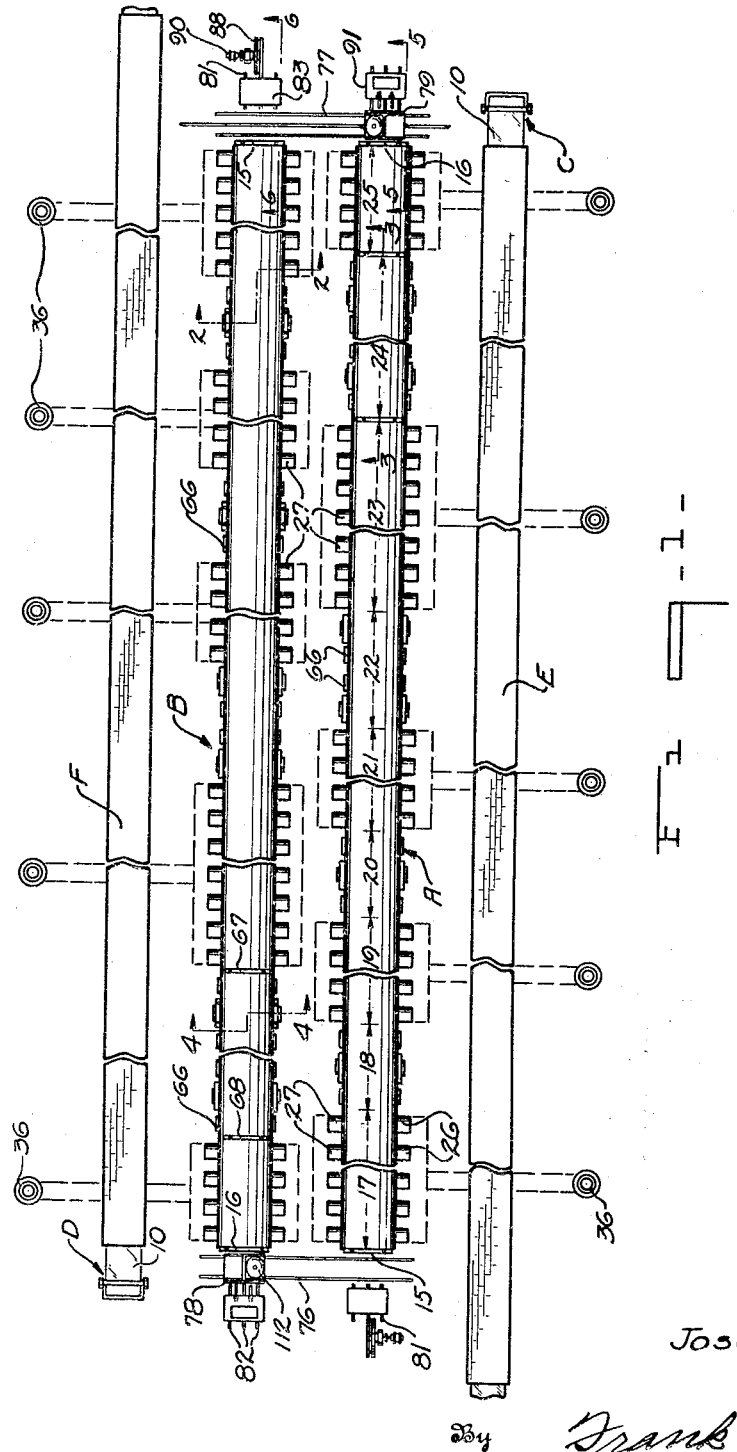

Inventor
Joseph P. Crowley
John C. Gipe
By Frank Fraser
Attorney

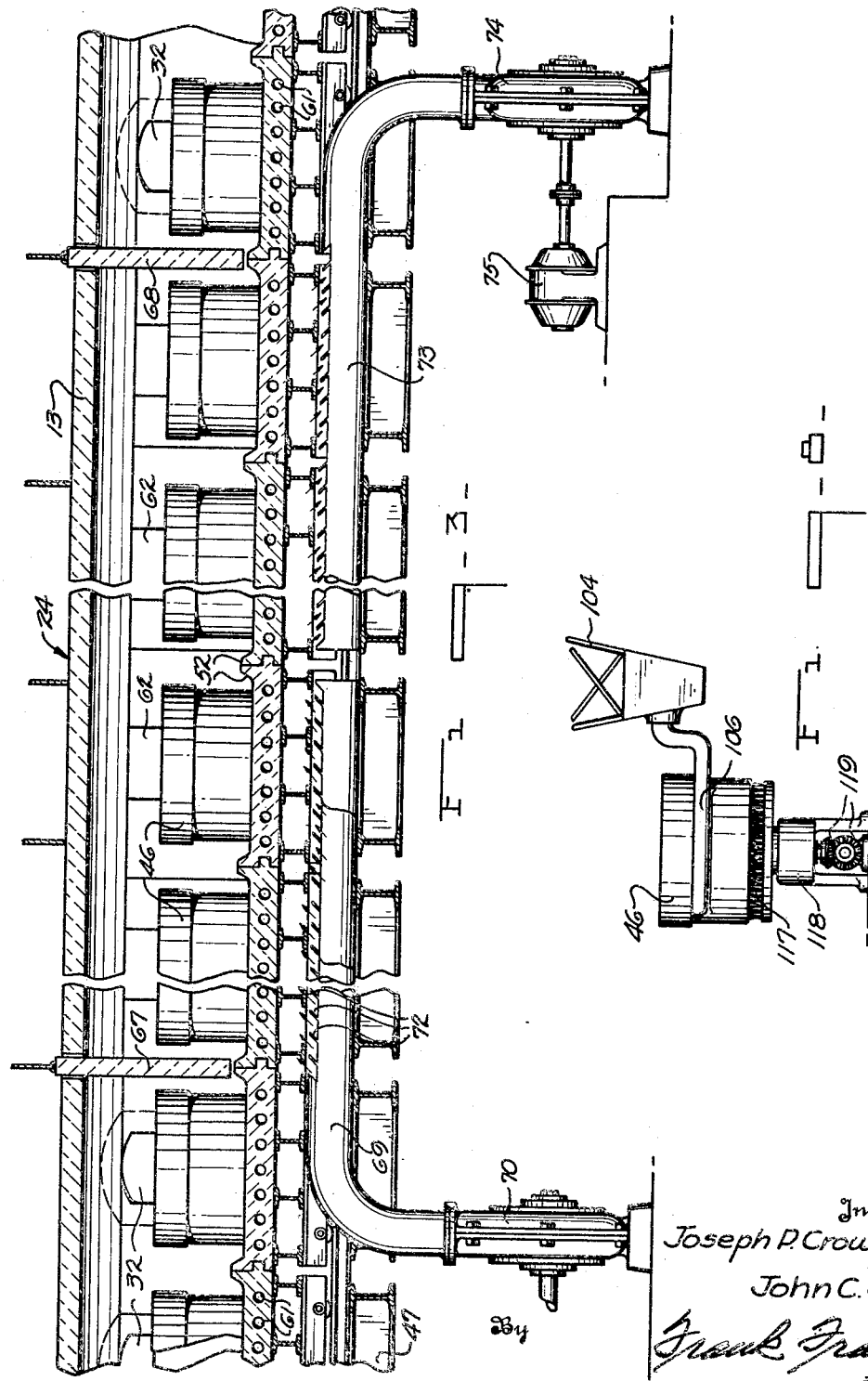

Aug. 16, 1932.  J. P. CROWLEY ET AL  1,872,414
PROCESS AND APPARATUS FOR PRODUCING MOLTEN GLASS
Filed Oct. 15, 1929  6 Sheets-Sheet 4
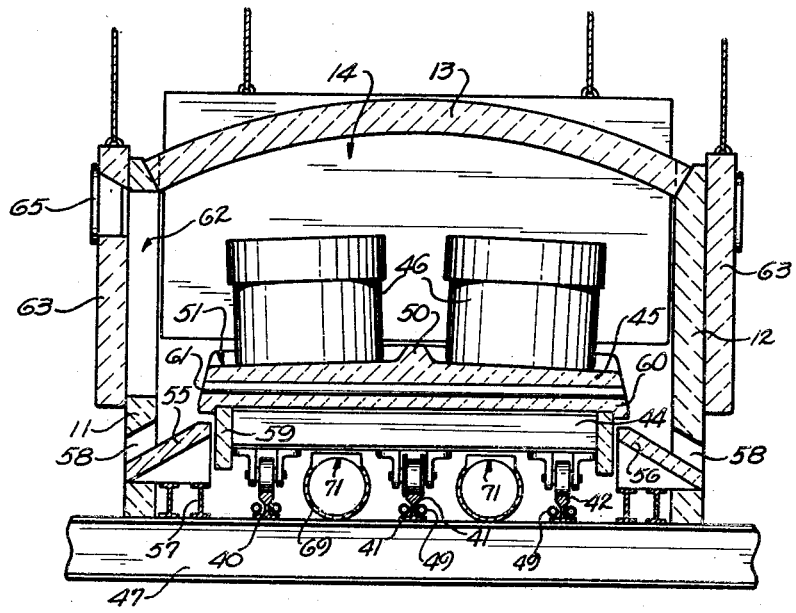
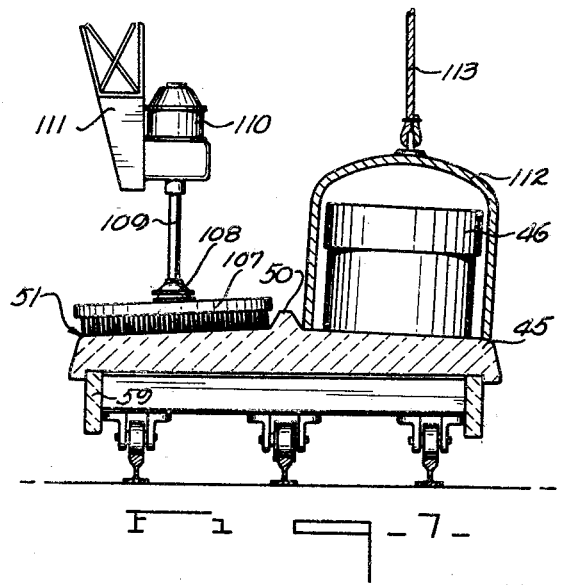
Inventor
Joseph P. Crowley
John C. Gipe
By Frank Fraser
Attorney

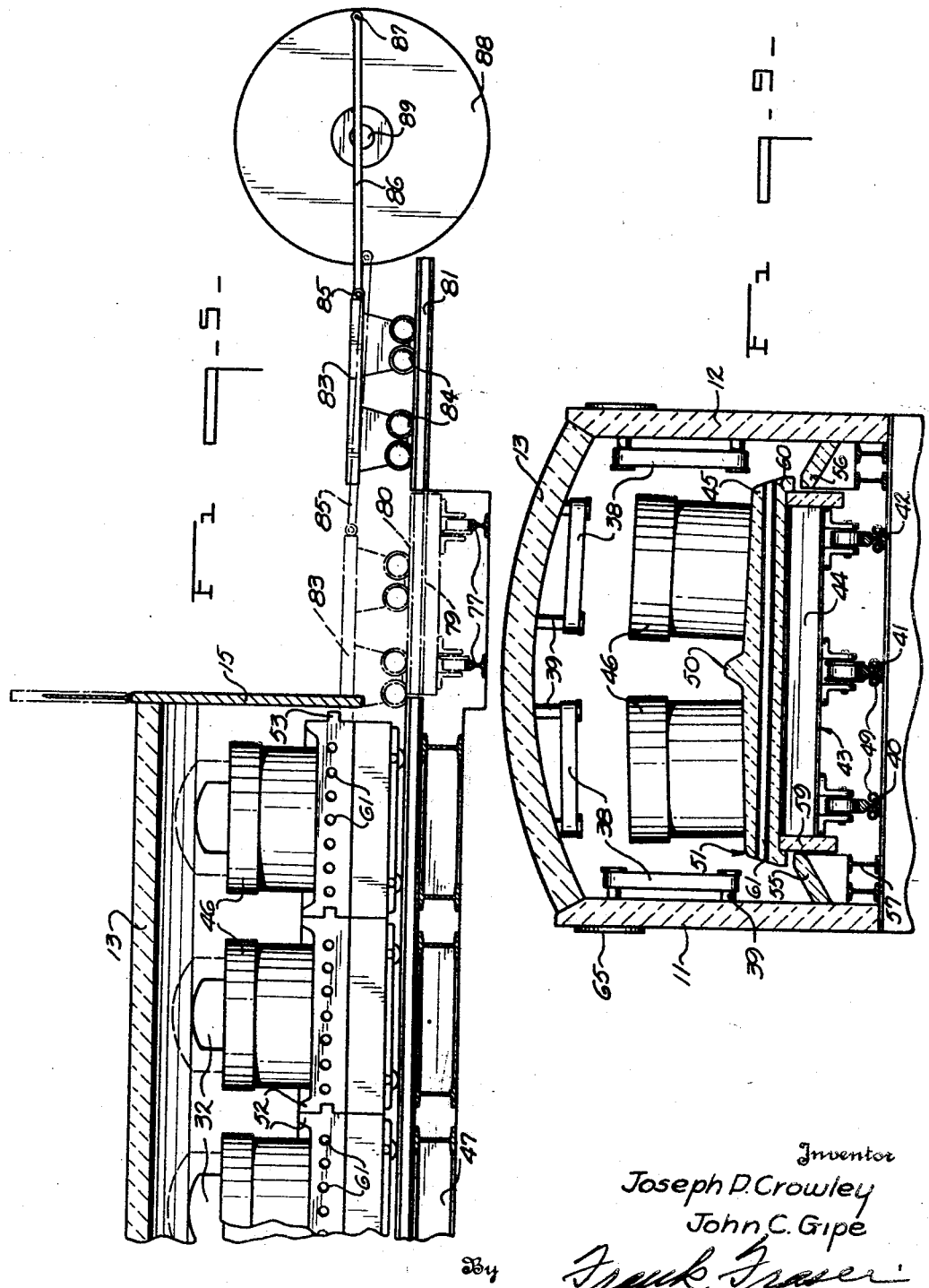

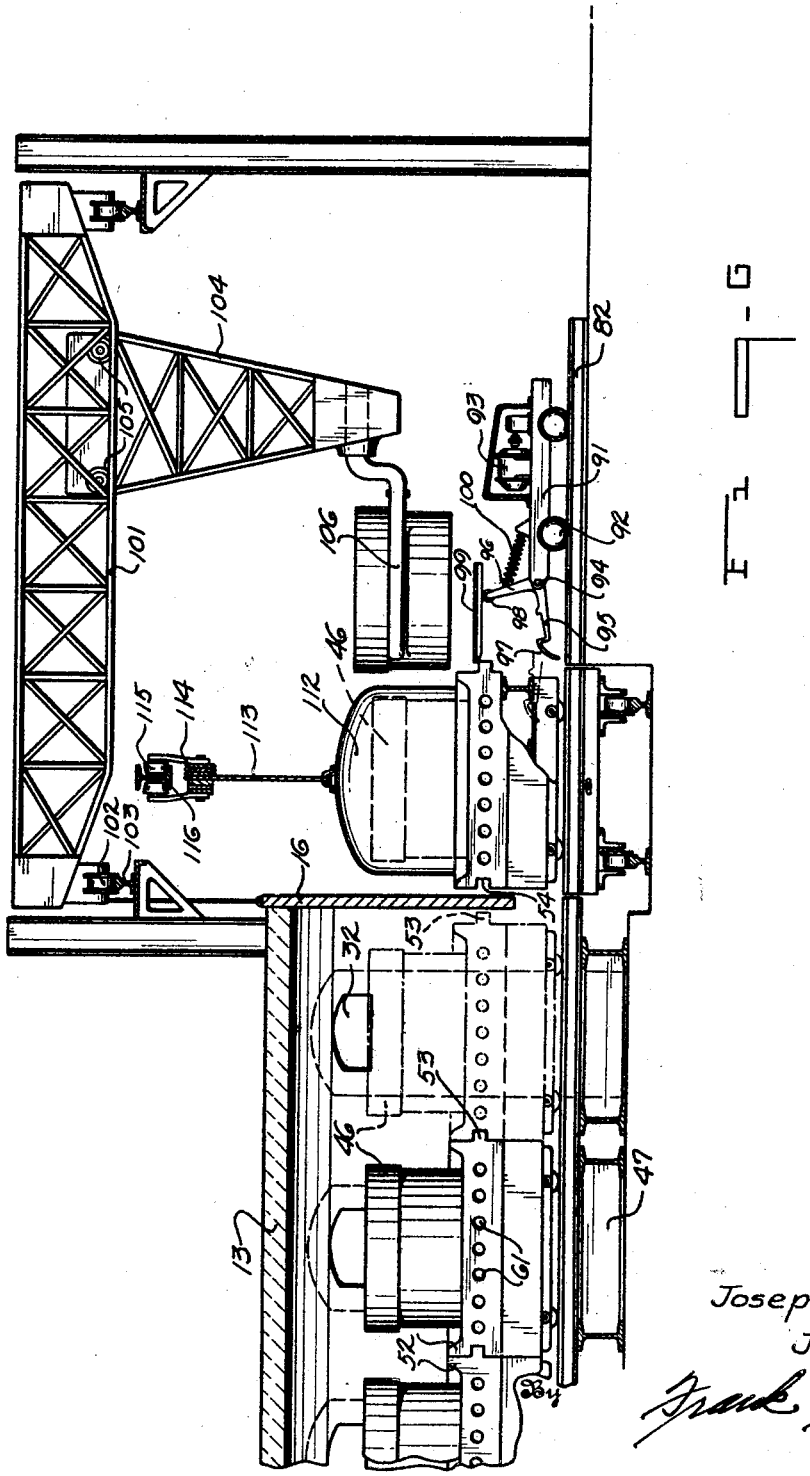

Patented Aug. 16, 1932

1,872,414

UNITED STATES PATENT OFFICE

JOSEPH P. CROWLEY AND JOHN C. GIPE, OF TOLEDO, OHIO, ASSIGNORS TO LIBBEY-OWENS-FORD GLASS COMPANY, OF TOLEDO, OHIO, A CORPORATION OF OHIO

PROCESS AND APPARATUS FOR PRODUCING MOLTEN GLASS

Application filed October 15, 1929. Serial No. 399,780.

This invention relates to an improved process and apparatus for the production of molten glass and particularly for the manufacture of what is commonly known in the art as pot glass.

So-called pot glass is desirable for use in the production of sheet or plate glass or other kinds of glassware because of its high quality, it being possible to produce pot glass which is relatively free from those common glass defects such as seeds, blisters, bubbles, etc. In order to produce this type of glass, a considerable length of time coupled together with the proper heat treatment is required, and the glass is usually melted and refined while maintained in a substantially quiescent state.

In the manufacture of pot glass, as ordinarily carried out, a series of pots are arranged within a suitable furnace and filled with raw glass making materials or batch. The batch ingredients are then subjected to high temperatures to reduce the same to a molten state after which the temperature of the furnace is so controlled and a suitable time allowed to effect the desired refining and settling of the molten glass. While, by following such a process, it is possible to produce molten glass of a relatively high quality, yet the process and apparatus as employed in the past are attendant with certain objectionable features which tend to increase production costs and which further have an adverse affect on the molten glass so that it is not of as high a quality as it could be made were such objectionable features eliminated. For example, heretofore, it has been necessary to alternately heat up the furnace to melt the glass and then gradually cool down the furnace to effect the refining, cooling and settling thereof. This continual varying of the temperature in the furnace naturally results in the consumption of a relatively large amount of fuel. Furthermore, the operation of pot furnaces of the conventional type requires considerable labor, while the regulation of the temperatures of the furnaces call for skilled high priced labor.

In its broad aspect, the aim of the present invention is the provision of a novel and improved process and apparatus for producing molten glass wherein those disadvantages incident to the operation of the ordinary pot melting furnaces may be eliminated while, at the same time, rendering possible the production of an even superior quality of molten glass than has heretofore been possible. Thus, the present process and apparatus will afford perfect conditioning of the glass so that the molten glass, after being melted and refined, will present a homogeneous mass, practically speaking, free from seeds, blisters, bubbles etc.

Another object of the invention is the provision of a process and apparatus wherein a series of pots may be successively filled at predetermined intervals with raw glass batch ingredients and the glass melted and refined therein while passing in a substantially continuous manner through the furnace, whereby to render possible the introduction of an empty pot through one end of the furnace, the charging of the pot from time to time and the passage of said pot through the furnace to the opposite end where the molten glass is in condition for pouring onto a casting table or for any other desired use to which it may be put.

According to the invention, there is provided a tunnel furnace of novel character wherein a series of pots or receptacles containing the molten glass or glass making materials are carried upon trucks or cars and moved progressively and preferably intermittently through the furnace. The movement of the pots is effected in a direction longitudinally of the furnace and causes them to pass through a plurality of zones of different temperatures which insure the perfect melting, refining, cooling and settling of the molten glass, additional glass making materials being charged into the pots from time to time. The furnace is divided longitudinally into a plurality of zones including a pre-heating zone wherein the pots may be heated and brought to the desired temperature before any batch ingredients are introduced therein; a plurality of alternately arranged filling-in and melting zones; a cooling zone in which the glass is gradually deprived of its excessive heat and brought to the desired temperatures; and finally, a conditioning or tempering zone wherein the glass, subsequent to being cooled, may be maintained at the desired temperature until it is ready for use. The temperatures of the several zones through which the glass is caused to travel are fixed so that it is not necessary to first raise and then lower the temperature in various parts of the furnace. After being once regulated, the temperatures in the different zones of the furnace may be maintained relatively constant which will insure a more perfect conditioning of the glass and result in the saving of a large amount of fuel. Also, less labor will be required to operate a furnace of this character and it will further eliminate the necessity of skilled high priced labor. In addition, the life of the pots or receptacles used will be prolonged due to the absence of exposure and the gradual temperature variations through which they pass. While the pots, containing the molten glass will be moved intermittently through the furnace, the glass will, nevertheless, be melted and refined while in a substantially quiescent state.

Another object of the invention is in the provision of novel means for effecting a positive cooling of the molten glass during its passage through the cooling zone, together with means for separating the atmosphere in the cooling zone from the atmosphere in the adjacent heating zones to the end that the temperature in the cooling zone may be controlled independently of and without adversely effecting the temperatures in said heating zones and vice versa.

Still another object consists in the provision of an improved layout embodying two or more pot melting furnaces arranged side by side with the outlet end of one furnace opposite the inlet end of the adjacent furnace, together with means for receiving and transferring the pots from the outlet end of one furnace to the inlet end of the adjacent furnace, and means for charging the pots into the furnaces and for removing the same therefrom.

Other objects and advantages of the invention will become more apparent during the course of the following description when taken in connection with the accompanying drawings.

Figure 2:
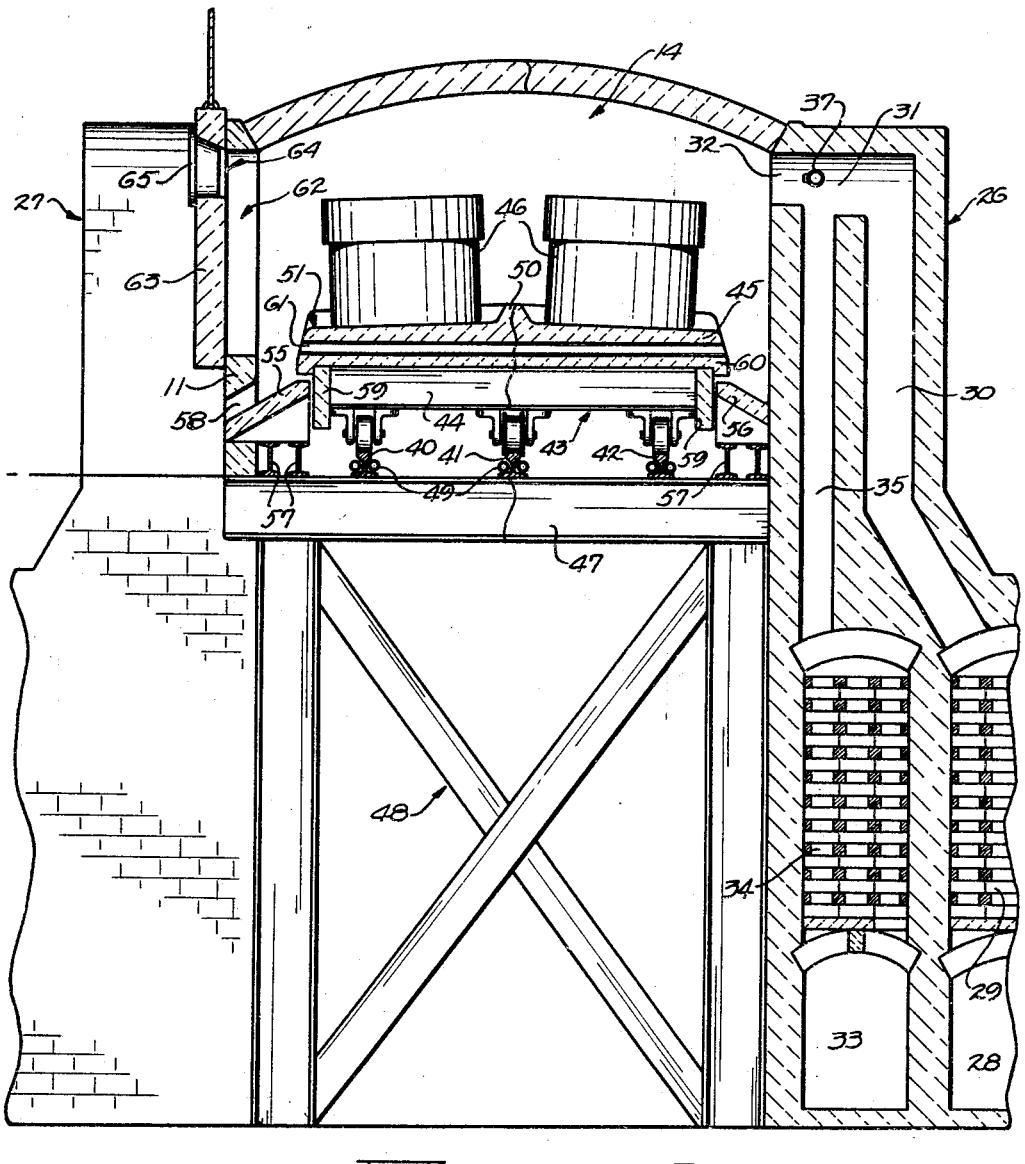

In the drawings forming a part of this application and wherein like numerals are employed to designate like parts throughout the same, Fig. 1 is a diagrammatic plan view of a layout or installation embodying two furnaces constructed in accordance with the present invention and two sheet rolling or casting machines associated therewith, Fig. 2 is a transverse section taken substantially on line 2—2 of Fig. 1, Fig. 3 is a longitudinal section taken substantially on line 3—3 of Fig. 1, Fig. 4 is a transverse section taken substantially on line 4—4 of Fig. 1, Fig. 5 is a section taken substantially on line 5—5 of Fig. 1 showing the means for charging the cars or trucks carrying the pots into the furnace, Fig. 6 is a section taken substantially on line 6—6 of Fig. 1 showing the means for withdrawing the cars or trucks from the furnace, Fig. 7 is a detail view showing the means for cleaning the upper surface of the car and the means for protecting the pot on the car from dirt and other foreign matter, Fig. 8 is a detail view showing the arrangement for cleaning the bottoms of the pots, and Fig. 9 is a transverse section through a furnace embodying electrical heating means.

Referring now to the drawings and with particular reference first to the general layout illustrated in Fig. 1, A and B designate two improved tunnel furnaces constructed in accordance with the present invention, said furnaces being arranged side by side and extending substantially parallel with one another. Associated with the furnaces A and B are the two sheet rolling or casting machines C and D arranged adjacent the outlet ends of the furnaces A and B respectively and including the annealing leers E and F which are arranged outwardly of and extend substantially parallel with and along side of the furnaces A and B. The casting machine C is positioned adjacent the outlet end of furnace A while the machine D is positioned adjacent the outlet end of furnace B. Thus, the molten glass produced within furnace A is adapted to be supplied, under normal conditions, to the casting machine C, while the molten glass produced within furnace B is adapted to be supplied to the casting machine D. Such a layout as described above is very desirable due to its compact arrangement. It also greatly facilitates the transfer of the pots from one furnace to the other and the transfer of the molten glass from the furnaces to the forming machines. The rolling or forming machines C and D may be of any desired character so that they will function to reduce the molten glass to sheet form as indicated at 10 and which sheet is then passed through its respective annealing leer E or F. Since the present invention in no way concerns the specific construction and operation of the rolling machines C and D per se, they will not be herein specifically illustrated or described. While a double layout involving two furnaces and two rolling machines have been illustrated, it will be apparent that only a single furnace and a single rolling machine may be used without departing from the spirit of the invention.

Each furnace A and B is of considerable length and comprises opposite side walls 11 and 12 and a crown or cover arch 13 forming the tunnel chamber 14, said tunnel extending throughout the entire length of the furnace. At the intake end of the furnace, the tunnel chamber is adapted to be normally closed by a vertically movable gate 15 (Fig. 5) while the opposite or outlet end thereof is closed by similar vertically adjustable gate 16 (Fig. 6). The furnace is divided longitudinally as shown in Fig. 1 into a plurality of successive zones 17, 18, 19, 20, 21, 22, 23, 24 and 25, said zones following one another from the intake end of the furnace to the outlet end thereof. The numeral 17 designates a preheating zone in which the pots or receptacles within which the glass is adapted to be produced are preheated, or raised to the desired temperature prior to the depositing of any glass making materials or batch therein. The numeral 18 designates the first filling-in zone and 19 the first melting zone, while the numerals 20 and 21 designate the second filling-in and heating zones respectively, and 22 and 23 the final or third filling-in and heating zones respectively. The numeral 24 designates the cooling zone in which the molten glass is deprived of its excessive heat and brought to the desired relatively low temperature, while 25 designates what might be termed a tempering or final conditioning zone within which the molten glass is adapted to be maintained at the proper desired casting or rolling temperature imparted to it in the cooling zone. In other words, after the glass has been completely melted and refined, it is brought down to the desired rolling temperature as it passes through the cooling zone 24 and the heat maintained within the tempering zone 25 is adapted to be only such as will nicely maintain the glass at this desired temperature and effect a final planing or conditioning thereof. From the above, it will be apparent that a plurality, namely three fill-in zones are provided or, in other words, raw glass making materials or batch are adapted to be deposited within the pots or receptacles a plurality of times. This is necessitated by the fact that the raw glass making materials take up a larger amount of space than the molten glass produced therefrom. Thus, even though the first fill-in of batch entirely fills the pot, after it is melted, the molten glass produced will not completely fill the pot, so that a second and then a third fill-in is required as is well known in the art. However, the length of the furnace can be varied as desired so as to include any preferred number of both heating and filling-in zones, the exact number shown being simply illustrative of the present invention.

The several heating zones 17, 19, 21, 23 and 25 may be heated in any suitable manner and by any desired character of fuel. For example, there may be located at the opposite sides of and in communication with the tunnel chamber of each heating zone, a series of cooperating pairs of regenerators 26 and 27, one regenerator being shown in vertical section at the right of Fig. 2, and one in elevation at the left thereof. These regenerators are identical in construction with one another so that a description of one will suffice for all. As shown, in the regenerator 26 in Fig. 2, air is drawn in through the tunnel 28 and after passing up through heated checker-work 29 and passages or flues 30 and 31, is delivered through the port or opening 32 into the tunnel 14 of the furnace, above the receptacles or pots containing the molten glass or glass producing materials.

If artificial gas is used, this gas may be drawn in through tunnel 33 and heated checker-work 34 and caused to pass upwardly through the passage or flue 35 into passage 31 and thence to the port or opening 32. The heating gases produced by the combustion of this air and gas will be drawn across the tunnel and the products of combustion will pass out through an oppositely disposed port communicating with regenerator 27, heating the checker-work of this regenerator and passing out through the tunnel thereof to the stack 36. It will be noted in Fig. 1 that each set of regenerators opposite each heating zone is provided with an individual stack so that the temperature in said zones may be varied and controlled independently of one another. At intervals the flow of gases is reversed, the combustion now taking place at the port of the regenerator 27 and the products of combustion passing out through the opposite port 32 and heating up the checker-work in the regenerator 26.

If natural gas is used, this gas may be introduced through burner pipes 37 positioned in the walls of the passages 31, adjacent ports 32. In such case, the tunnel 33 and checker-work 34 may be left idle or may be used for delivering air either with or alternative to the tunnel 28 and checker-work 29. If desired, all of the heating zones or one or any number less than all may be heated by electrical means such as illustrated in Fig. 9 wherein a plurality of electric heating elements 38 are shown. While the electric heating elements may be of any desired type, they have herein been shown as taking the form of bands carried by insulators 39, the electric heating elements being carried by the side walls 11 and 12 of the furnace and also by the crown or top 13 thereof. For instance, it might be found desirable to heat the melting zones proper, such as zones 19, 21 and 23, with the regenerative heating means, while heating the preheating zone 17 and the tempering zone 25 electrically or vice versa or in any other combination. From the above, it will be apparent that the temperature of the several heating zones is adapted to be controlled independently of one another and that the temperature in each zone can be readily varied as circumstances may require by the means before described.

Extending longitudinally through the furnace are a plurality of spaced parallel rails 40, 41 and 42 for supporting the wheels of the trucks or cars which are indicated generally by the numeral 43, each car or truck comprising a metallic framework 44 carrying the superstructure or top 45 preferably built up of layers of fire-resisting material and adapted to support the pots or receptacles 46 within which the molten glass is to be produced. The trucks or cars herein shown are of such a size that only two pots may be supported thereupon side by side although the cars can of course be larger if preferred. The rails 40, 41 and 42 are shown as being supported upon a plurality of spaced cross ties 47 carried by a suitable framework 48. These rails are also preferably cooled by means of the cooling pipes 49 which extend longitudinally at opposite sides thereof and through which is adapted to be circulated a suitable cooling medium.

The top of each car or truck 43 is preferably provided intermediate its side edges with a longitudinally extending rib 50 and the top surface 51 of said car slants downwardly and outwardly from said rib so that the pots 46 are supported at a slight angle as clearly indicated in Fig. 2. This car construction is provided in order that should any one of the pots become broken during its passage through the furnace, the molten glass will be directed downwardly and outwardly from off the car and will be prevented from flowing onto the other side of the car by the rib 50. The cars are also provided at their opposite ends with similar transversely extending ribs 52 which serve to prevent any of the molten glass from flowing from one car onto the adjacent cars so that in the event one of the pots should break, the molten glass therefrom will be confined to one side of one car or, in other words, upon that portion of the car upon which the broken pot is supported. Each car is also preferably provided with a forwardly extending tongue 53 adapted to fit within a correspondingly shaped groove 54 in the adjacent end of the adjoining car to prevent molten glass from seeping downwardly therebetween in the event it should overflow from one car onto the adjacent cars.

Extending along the opposite side walls 11 and 12 of the furnace inwardly thereof are the inclined directing runways 55 and 56 supported upon I-beams 57 mounted upon the cross ties 47. The runways 55 and 56 may be constructed of a plurality of slabs positioned end to end and are adapted to cooperate with the adjacent side walls of the furnace to form troughs or gutters for catching therein the molten glass flowing from the cars as occasioned by the breaking of a pot or pots. This molten glass can be flowed exteriorly of the furnace through suitable drain openings 58 in the side walls thereof. In order to protect the metallic portions of the trucks or cars 43 as far as possible, from the intense heat within the heating zones, the cars may be further provided with the refractory depending side skirts or aprons 59 and the tops 45 thereof may project outwardly over the runways 55 and 56 as indicated at 60. This construction will tend to prevent the passage of the products of combustion down around the wheels and metallic supporting structure of the trucks and will, in addition, serve to prevent cold drafts of air from passing upwardly around the tables and licking the side walls of the pots 46. It will be noted that the tops 45 of the trucks or cars constitute, in effect, a movable bottom for the furnace and that an open passageway is provided beneath the cars to prevent over-heating of the metallic portions thereof and the metallic supporting structure. The tops 45 of the cars or trucks 43 may also be provided with a plurality of spaced transverse flues 61 through which the heated atmosphere within the heating zones may circulate in order to assist in maintaining the upper surfaces 51 of the cars at the desired temperature.

The side walls 11 and 12 of the furnace opposite the filling-in zones 18, 20 and 22 and also opposite the cooling zone 24, are provided with one or a plurality of relatively large openings 62 normally closed by an adjustable gate or shear-cake 63 having a relatively smaller opening 64 formed therein and closed by a cover 65. Should one of the pots 46 become broken during its passage through the furnace, it can be readily removed through one of the openings 62 upon raising of the gate 63. The glass making materials or batch may be charged into the receptacles or pots 46 through the smaller opening 64 without the necessity of raising gate 63. In addition to the openings 64, a plurality of additional relatively small openings may be provided in the side walls of the furnace and closed by the covers 66 (Fig. 1). It is preferred that fill-in openings be provided opposite each position the pots will assume during their intermittent travel through the filling-in zones. The filling-in of the batch can be accomplished in any desired manner and by any conventional or preferred means such as by the use of a ladle or by an automatic charging mechanism.

The cooling zone 24 is preferably separated from the adjacent heating and tempering zones 23 and 25 respectively by the provision of vertically adjustable gates 67 and 68 shown particularly in Fig. 3 so that the temperature within the cooling zone can be maintained independently of and without adversely affecting the temperature within the adjacent heating zones and vice versa. In fact, adjustable gates may be used to separate any of the other zones or the filling-in zones from the heating zones so as to maintain the temperature in adjacent zones entirely independent and in order to permit a variation of the temperature in one zone without affecting the temperatures in the adjacent zones. Novel means is herein provided for effecting a positive cooling of the molten glass as it passes through the cooling zone and to this end, a plurality of spaced parallel pipes or conduits 69 are arranged longitudinally within said zone beneath the cars or trucks. The pipes 69 extend only about one half the length of the cooling zone and are connected at one end with a blower 70 operated from a suitable motor, not shown. The conduits 69 are each provided with a plurality of upwardly facing slots 71 through which the air is adapted to be forced against the bottoms of the cars, the direction of the air being controlled by the provision of the inclined upstruck fins or baffles 72. Thus, upon operation of blower 70, air of the desired temperature can be forced through the pipes and against the bottoms of the cars or trucks. The cooling of the cars will likewise effect a cooling of the receptacles 46 and of the glass contained therein. Also arranged within the cooling zone 24 and extending longitudinally thereof beneath the cars are a plurality of spaced parallel pipes or conduits 73 similar to and preferably arranged in line with the conduits 69. The pipes 73 are connected to an exhaust pump 74 driven from a motor or the like 75. With such an arrangement, as the air discharged into the cooling zone through the pipes 69 becomes heated and thus loses its cooling effect upon the cars, it is drawn off through the pipes 73. Thus, a continuous circulation of cooling air can be maintained within the cooling zone beneath the cars. This method of cooling the glass is an important factor of the present invention in that with such an arrangement, the glass within the pots can be cooled upwardly from the bottom as distinguished from cooling the glass downwardly from the top. By cooling the glass upwardly from the bottom, it will be apparent that any air and gas bubbles contained within the molten glass will be permitted to gradually work upwardly therethrough to the surface of the glass where they will break. On the other hand, when the glass is cooled from the top downwardly, a relatively tough layer of skin is formed upon the surface of the molten glass which will act to prevent the gas and air bubbles within the molten glass from passing upwardly therethrough to the surface thereof. It is, of course, desirable and in fact necessary that these gas and air bubbles be removed in order to obtain a good quality of molten glass. These bubbles, if permitted to remain within the molten glass, cause defects such as seeds and blisters therein. By cooling the glass upwardly from the bottom, the gas and air bubbles are permitted to escape whereas when cooling the glass downwardly from the top, such bubbles will be trapped therein causing defects in the ware produced from the glass.

Briefly stated, in carrying the invention into practice with the general layout illustrated in Fig. 1, the trucks or cars 43 carrying the pots 46 containing the glass batch ingredients are adapted to be passed to the right first through furnace A with such passage being preferably intermittent. As the trucks issue from the outlet end of furnace A, the pots are removed therefrom and the molten glass contained therein and which has been produced within the furnace is supplied to the rolling machine C. The empty pots are then replaced upon the trucks, the trucks transferred to the intake end of furnace B and passed to the left through said furnace to effect the melting of additional molten glass. As the trucks issue from the outlet end of furnace B, the molten glass within the pots is adapted to be supplied to the rolling machine D. The trucks and pots are then again transferred to the intake end of furnace A and the above cycle of operations repeated. The means which may be provided for transferring the cars or trucks from the outlet end of one furnace to a position opposite the inlet end of the adjacent furnace, for charging the trucks into the furnace, and for removing them from the opposite end thereof may take a variety of different mechanical expressions. However, for the purposes of illustration, there is exemplified in Figs. 1, 5 and 6 apparatus for accomplishing these functions. The transfer means includes the transversely extending transfer track 76 and 77 extending between the furnaces at opposite ends thereof and upon which are mounted the transfer tables 78 and 79, each of said transfer tables being provided with a plurality of rails 80 which are adapted to line up with the rails 40, 41 and 42 which extend longitudinally through each furnace. Arranged outwardly of each transfer track 76 and 77 are a plurality of auxiliary sets of rails 81 and 82 positioned in alignment with the rails extending through the furnaces.

The means employed for charging the cars or trucks 43 into the furnaces is shown particularly in Fig. 5 and comprises a pusher 83 mounted upon wheels 84 and normally positioned upon the auxiliary rails 81 at the inlet end of each furnace A and B when not in use. Pivoted to the rear end of the pusher 83 as indicated at 85 is a pitman rod 86 pivoted at its opposite end as at 87 to a wheel or disk 88 carried upon a shaft 89 driven from a motor 90, through suitable reduction gearing. When it is desired to charge one of the cars or trucks 43 into the furnace, the said car or truck is positioned upon the rails 80 of the transfer table 78 or 79 dependent upon whether it is to be charged into furnace A or B and the said transfer table moved along its respective transverse track 76 or 77 until the rails thereon are brought into alignment with the main rails 40, 41 and 42 extending through the furnace. The transfer table is then stopped and the motor 90 placed in operation to rotate the wheel 88, whereupon the pusher 83 will be moved forwardly to abut the adjacent end of the car or truck upon the transfer table and will force or push the same from said transfer table into the furnace, it being of course understood that the gate 15 has previously been moved to an elevated position to give access to the furnace. After the truck or car is properly pushed within the furnace, the wheel 88 is rotated to withdraw the pusher 83 onto the auxiliary rails 81 after which the gate 15 is closed.

The means for removing the cars 43 from the outlet end of either furnace is shown particularly in Fig. 6 and may consist of an operating car or dinkey 91 mounted upon wheels 92 and normally maintained when not in use upon the auxiliary rails 82. The forward and rearward movements of the dinkey may be controlled upon operation of a motor 93 carried thereby. Pivoted to the forward end of the dinkey as at 94, is a bell crank lever including the two arms 95 and 96, the arm 95 being provided at its outer end with a hook 97, while the arm 96 carries at its outer end a roller 98 adapted to engage a fixed substantially horizontal plate 99. The bell crank lever is normally urged upwardy about its pivot by a spring 100 secured at one end to the arm 96 and at its opposite end to dinkey 91. When it is desired to remove one of the cars from the furnace, the transfer table is first brought into position so that the rails 80 thereon will align with the main rails extending through the furnace. The gate 16 at the outlet end of the furnace is then raised and the dinkey 91 moved forwardly across the transfer table until the hook 97 thereof engages the first car 43 as indicated by the broken lines in Fig. 6 by snapping under a portion of the metallic framework thereof which may be an I-beam as shown. The dinkey is then started rearwardly to pull the car from within the furnace onto the transfer table. When the car has been brought into proper position upon the transfer table, the roller 98 engaging plate 99 will rock the bell crank lever about its pivot to move the hook 97 downwardly and out of engagement with the car so that the dinkey may be returned onto the auxiliary rails 82 while permitting the car to remain upon the transfer table. The transfer table can then be moved to a position opposite the intake end of the adjacent furnace and the car pushed therefrom into this furnace by the charging means previously described.

The preferred operation of the present invention is as follows: The cars or trucks 43 carrying the pots 46 are first delivered one after the other into the intake end of furnace A in the manner and by the means above described. The cars are first moved through the preheating zone 17 wherein the pots are preheated and brought to the desired temperature prior to the depositing of any glass batch ingredients therein. Continued movement of the cars will bring the pots into the first filling-in zone 18 where they are adapted to be filled with raw glass making materials introduced thereinto through the filling-in openings 64 and 66. The cars then carry the pots through the first heating zone 19 wherein the glass making materials are fused to produce molten glass. As above pointed out, the molten glass does not consume as much space as the raw glass making materials so that when the pots are brought to the second filling-in zone 20 they are again filled up with batch. This additional batch is melted during the passage of the pots through the heating or melting zone 21 and additional batch is placed within the pots when they are brought into the filling-in zone 22 after which the pots are carried through the heating zone 23 wherein the last batch added is reduced to molten glass. During the passage of the pots through the furnace, the temperatures in the melting zones 19, 21 and 23 as well as the temperature in the preheating zone 17 and tempering zone 25 can be regulated as desired independently of one another, and the temperatures in the various zones after being once properly regulated can be maintained relatively constant so that it is not necessary in the present improved type of furnace to alternately heat up and then cool down any portion thereof. The molten glass is then carried through the cooling zone 24 wherein it is deprived of its excessive heat and brought down to the desired temperature for casting or rolling. The molten glass is then carried through the conditioning or tempering zone 25 wherein the glass is maintained at the desired temperature until it is ready for use. In other words, the temperature within the tempering zone 25 is adapted to be such that it will hold the molten glass at the proper temperature and effect the final refining and settling thereof. As the cars reach the exit end of the furnace, they are successively withdrawn in the manner and by the means above described. As each car is withdrawn, another car is charged into the opposite end of the furnace and the charging of this car into the furnace will effect the movement of all of the preceding cars within the furnace therethrough a distance equal to the length of one car. Thus, the travel of the cars through the furnace is intermittent. As each succeeding car is withdrawn from furnace A the pots thereon are picked up and the molten glass discharged or poured therefrom onto the rolling or forming machine C. The picking up of the pots and the pouring of the molten glass therefrom may be accomplished in any desired manner such as by the means shown in Fig. 6, wherein there is employed for this purpose a movable crane 101 mounted upon wheels 102 which run along rails 103 extending transversely of the furnace. Carried by the crane 101 is a carrier 104 mounted upon wheels 105 and movable along the crane 101 in a direction at substantially right angles with respect to the direction of movement of crane 101 or, in other words, longitudinally of the furnace. Supported by the carrier 104 is a pot lifting bracket 106 which is adapted to engage the pot and support it during its transfer to the forming machine. The bracket 106 is also rotatable about a substantially horizontal axis so that the pot may be tilted to discharge the molten glass therefrom. During the time that the molten glass is being delivered from one pot to the forming machine C, it is desirable that that portion of the upper surface of the table from which the pot has been removed be cleaned and this can be effected by the provision of a brush 107 secured by means of a universal connection 108 to the lower end of a vertical shaft 109 driven from a motor 110 and supported by a frame 111. During the cleaning of the upper surface of this portion of the car, the contents of the pot remaining upon the car is adapted to be protected from flying dirt and other foreign matter by means of a hood or bell shaped cover 112 which is lowered thereover as shown in Fig. 7. This hood will also prevent undesirable dissipation of heat from the molten glass within the pots. This cover is carried at the lower end of a table 113 depending from a hanger frame 114 having wheels 115 mounted to travel along the guide rail 116. After the pot removed from the car has been emptied and before it is replaced thereupon, the bottom surface of said pot is adapted to be cleaned by means of a brush 117 shown in Fig. 8, said brush being supported by a frame 118 and driven through the intermeshing gears 119. After the bottom of the pot has been cleaned, the said pot is replaced upon the cleaned surface of the car, the cover 112 is removed from the full pot and the said pot picked up and the contents thereof also delivered to the forming machine C. During the removal of this pot from the car, the upper surface of the car upon which it normally rests is also adapted to be cleaned and the bell shaped cover 112 is then lowered over the empty pot to protect it from dirt and other foreign matter. After the glass has been delivered from the second pot to the forming machine, the bottom of this pot is also cleaned and the said pot replaced upon the car. The transfer table 79 is then moved along the transfer track 77 to bring the car with the empty pots opposite the intake end of furnace B. The cars are then charged into the furnace B and additional molten glass produced within the pots as they are carried therethrough. As the cars issue from the outlet end of furnace B, the molten glass produced is delivered to the forming machine D. The cars are then transferred to the intake end of furnace A and the above cycle of operations repeated.

The cleaning of the upper surfaces of the tables and the bottoms of the pots is desirable after each melting operation in order to remove therefrom the coke breeze which is used to cover the tables during the melting operation. In other words, if the bottoms of the pots contacted directly with the upper surfaces of the tables, the pots would stick thereto and in order to avoid this, a bed of coke breeze or the like is first placed upon the tables and the pots then placed thereupon. After each melting operation, the old bed of coke breeze is adapted to be removed and a fresh bed formed thereon prior to the next melting operation. Molten glass produced in accordance with the present invention will be of an exceedingly high quality. The furnaces can be economically operated and will require but little attention as compared with ordinary pot furnaces. It is believed that the present invention will be clearly understood from the above description taken in connection with the accompanying drawings.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In combination, a pair of continuous pot furnaces for melting glass, each having a plurality of moving carriers therein supporting a plurality of portable pots within which the molten glass is produced, said furnaces being arranged side by side and extending substantially parallel with one another with the outlet end of one furnace opposite the inlet end of the adjacent furnace, transfer means between the furnaces at their ends so that the moving carriers issuing from the outlet end of one furnace may be transferred to the inlet end of the adjacent furnace, a sheet glass forming mechanism associated with each furnace, each sheet forming mechanism including a rolling machine positioned opposite the outlet end of its respective furnace and a longitudinally extending annealing leer arranged at the side of and extending parallel with the adjacent furnace outwardly thereof, and means for removing the portable pots from the carriers as they issue from the furnaces, discharging the molten glass therefrom to the respective rolling machine, and replacing the pots upon the carriers.

2. A continuous pot furnace for melting glass having a plurality of moving carriers therein, said furnace being of tunnel-like construction and divided longitudinally into a plurality of zones including alternately arranged filling-in and melting zones and a cooling zone, and means disposed within the cooling zone beneath said carriers for maintaining a continuous circulation of air therebeneath whereby to cool the same.

3. In combination, a continuous pot furnace for melting glass having a plurality of moving carriers therein adapted to support pots thereupon, means for cleaning the upper surface of each carrier as it is withdrawn from the furnace and during the removal of one of the pots therefrom, and means for protecting the contents of the other pot or pots remaining upon the carrier from dust, dirt and the like during the cleaning operation.

4. In combination, a continuous pot furnace for melting glass having a plurality of moving carriers therein adapted to support pots thereupon, means for cleaning the upper surface of each carrier as it is withdrawn from the furnace and during the removal of one of the pots therefrom, and a cover adapted to be lowered over the pot or pots remaining upon the carrier for protecting the contents thereof from dust, dirt and the like during the cleaning operation.

5. A continuous pot furnace for melting glass having a plurality of moving carriers therein, each carrier being adapted to support a plurality of pots thereupon and having a vertical rib extending longitudinally thereof intermediate its side edges and vertically arranged transverse ribs at opposite ends therof.

6. The method of melting glass in pots, consisting in introducing the pots into one end of a furnace, passing the pots progressively through a plurality of melting zones, maintaining the temperatures in said zones as the pots move therethrough whereby the glass is melted and fined, admitting batch to said pots as they pass from one melting zone to the next melting zone, effecting a positive cooling of the molten glass in said pots from the bottom upwardly, and in then removing the pots from the opposite end of the furnace.

7. The method of melting glass in pots, consisting in introducing the pots into one end of a furnace, passing the pots progressively through a plurality of melting zones, maintaining the temperatures in said zones as the pots move therethrough whereby the glass is melted and fined, admitting batch to said pots as they pass from one melting zone to the next melting zone, effecting a positive cooling of the molten glass in said pots from the bottom upwardly, then passing the pots through a conditioning zone wherein the glass is maintained at the desired temperature until ready for use, and in finally removing the pots from the opposite end of the furnace.

8. A continuous pot furnace for melting glass having a plurality of moving carriers therein, said furnace being of tunnel-like construction and divided longitudinally into a plurality of zones including alternately arranged filling-in and melting zones and a cooling zone, and means disposed within said cooling zone for cooling the same, said means including a plurality of spaced parallel conduits arranged longitudinally within said zone beneath the moving carriers therein, said conduits being provided with upwardly facing openings, means for blowing air through said conduits, a second plurality of spaced parallel conduits arranged within the cooling zone in substantial alignment with the first mentioned conduits and being also provided with upwardly facing openings, and means associated with the second mentioned conduits for drawing off the air from within said cooling zone after the said air becomes heated.

9. A continuous pot furnace for melting glass having a plurality of moving carriers therein, each carrier being adapted to support a plurality of pots thereupon and having a vertical rib extending longitudinally thereof intermediate its side edges and vertically arranged transverse ribs at opposite ends thereof, the upper surface of the carrier inclining downwardly and outwardly from the central longitudinally extending rib to its side edges, said carrier being further provided with a plurality of spaced transverse flues through which a heating or cooling medium may circulate.

10. The method of producing molten glass in pots, which consists in introducing the pots into a furnace, admitting batch to the pots at spaced intervals, maintaining the temperatures within the furnace such that the glass within the pots will be melted and fined, and in effecting a positive cooling of the molten glass within the pots from the bottom upwardly.

Signed at Toledo, in the county of Lucas, and State of Ohio, this 11th day of October, 1929.

JOSEPH P. CROWLEY.
JOHN C. GIPE.